(No Model.) 2 Sheets—Sheet 1.

B. McGOVERN.
CLUTCH.

No. 512,736. Patented Jan. 16, 1894.

WITNESSES
Frank G. Parker,
A. G. Belcher.

INVENTOR
Bernard McGovern,
By his Att'y
Henry W. Williams (No Model.) 2 Sheets—Sheet 2.

B. McGOVERN.
CLUTCH.

No. 512,736. Patented Jan. 16, 1894.

WITNESSES
Frank G. Parker
A. G. Belcher

INVENTOR
Bernard McGovern
By his Atty
Henry Williams

UNITED STATES PATENT OFFICE.

BERNARD McGOVERN, OF BOSTON, MASSACHUSETTS.

CLUTCH.

SPECIFICATION forming part of Letters Patent No. 512,736, dated January 16, 1894.

Application filed July 24, 1893. Serial No. 481,252. (No model.)

*To all whom it may concern:*

Be it known that I, BERNARD McGOVERN, a citizen of the United States, residing in Boston, in the county of Suffolk and State of Massachusetts, have invented a new and useful Improvement in Clutches, of which the following is a specification.

This invention has for its principal object to avoid rattling by preventing looseness or lost motion when the two parts of the clutch come together, and it consists in the novel construction and arrangement of parts hereinafter described and illustrated in the accompanying drawings, in which—

Figures 1, 2:
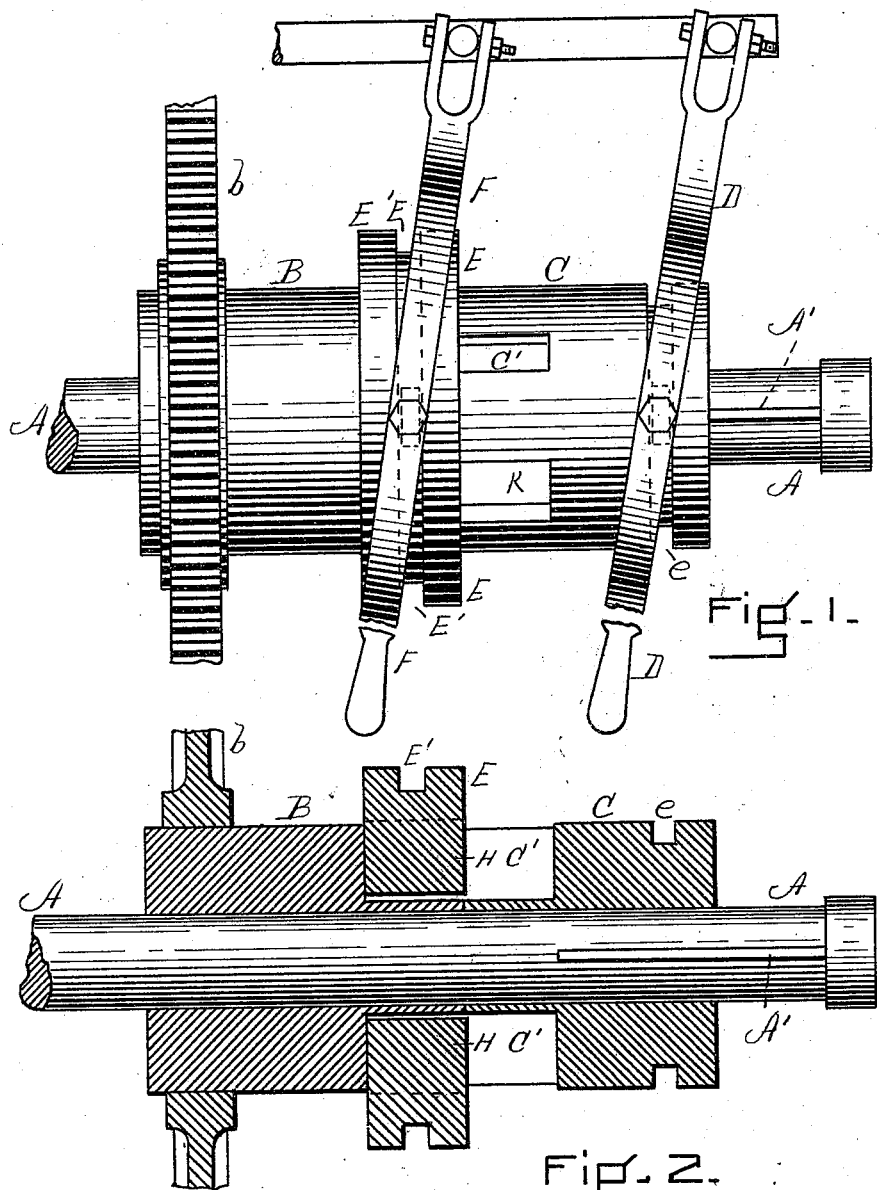
Figure 3:
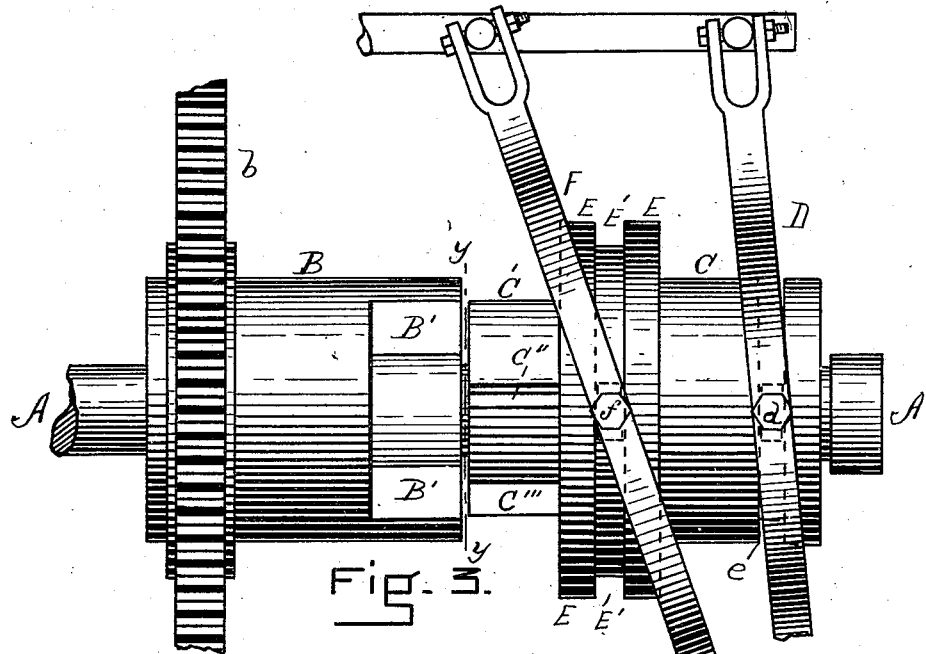
Figure 4:
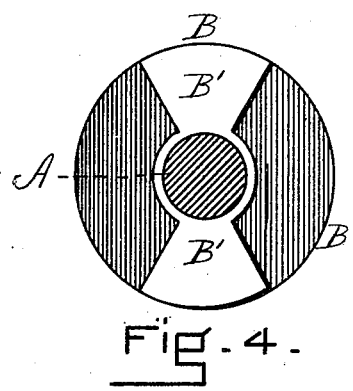
Figure 5:
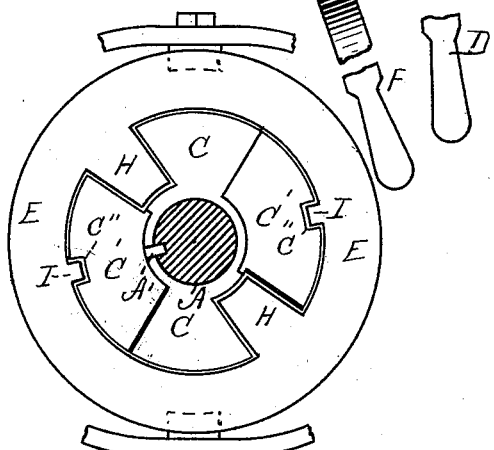
Figure 6:
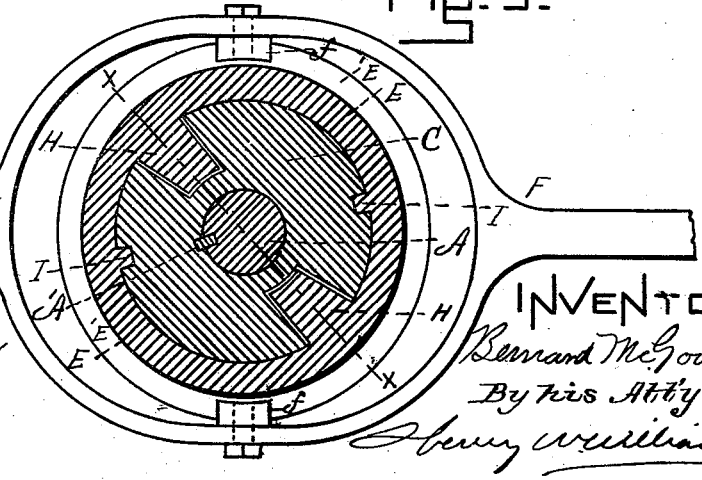

Figure 1 is a plan view of a clutch embodying my invention with the two parts in engagement. Fig. 2 is a horizontal section taken on line $x$, Fig. 6, the parts being in engagement. Fig. 3 is a plan view with the parts out of engagement or unclutched. Fig. 4 is a section taken on line Y, Fig. 3, looking toward the left and showing the recessed hub or pulley B. Fig. 5 is a section taken on line Y, Fig. 3, looking toward the right. Fig. 6 is a cross section taken through the locking ring when in the position shown in Fig. 3.

Similar letters of reference indicate corresponding parts.

A represents the shaft. B is the loose pulley or sleeve, loose on said shaft and provided with recesses B'. This pulley may be connected by a gear $b$, or any other suitable means, with the work, such as hoisting mechanism for instance.

C is the other part of the clutch sliding on the shaft A but prevented from relative rotative movement by the spline A'. This part C is provided with projections C' which are adapted to be moved into the recesses B' of the part B by means of an ordinary shipping lever D, a projection $d$ from which enters the annular groove $e$ on the part C. Thus far there is nothing new, the device described being the ordinary clutch of this class or style.

It is found in practice that when one part of the clutch is moved into engagement with the other there is more or less rattling by reason of the relative rotative movements of the two parts of the clutch, and of the projections C' in the recesses B'. To obviate this difficulty I provide the ring or annular cap E. This ring is adapted to slide freely on the part C by means of the shipping lever F a projection $f$ from which enters the annular groove E' on the periphery of said ring. While the ring or cap is free to slide laterally, it has no rotative movement with relation to the part C inasmuch as it is provided with integral projections I which extend from the inner side of the ring into corresponding longitudinal grooves C'' in the part C. These grooves serve as guides for the sliding of the ring. Moreover this ring is provided with integral, inwardly extending projections or keys H which extend into corresponding radial supplemental recesses K in the part C, such recesses extending inward from the inner walls of the recesses C''' formed by the spaces between the projections C'. These recesses K are located next a projection C' and the remainder of the space in each recess C''', *i. e.* the portion of said recess C''' between the edge of the recess K and the farther projection C', is equal to the excess of the width of a recess B' in the part B over the width of a projection C' from the part C. The normal position of the ring E is toward the right, as shown in Figs. 3 and 6, that is to say with its projections H within the recess K. Now if the part C be moved by the shipping lever D into engagement with the part B, the excess of the width of the recess B' over that of the projections C', will cause rattling; but if at the same time that the parts are moved into engagement, the shipping lever F moves the ring E, (guided by the projections I and grooves C'') toward the left into the position shown in Figs. 1 and 2, its projections or keys H will leave the recesses K and move into and fill the excess of space in the recesses B', so that there is no rattling or lost motion. When the device is unclutched the ring E may be moved back into the position shown in Fig. 3.

Having thus fully described my invention, what I claim, and desire to secure by Letters Patent, is—

In combination with the two parts B and C of the clutch, said parts being provided respectively with the recesses B' and projections C', the said projections being of less width than the said recesses, and the said part C being further provided with the supplemental recesses K extending inward from the recesses C''' formed by said projections C', the locking ring or annular cap E adapted to be moved laterally but not rotatively on the part C and provided with the inward projections or keys H of size and shape to fit into the recesses K when the device is clutched and into the excess of space in the recesses B' when the device is unclutched, substantially as set forth.

BERNARD McGOVERN.

Witnesses:
HENRY W. WILLIAMS,
A. G. BELCHER.